US008711370B1

(12) United States Patent
Smits

(10) Patent No.: US 8,711,370 B1
(45) Date of Patent: Apr. 29, 2014

(54) SCANNING OPTICAL POSITIONING SYSTEM WITH SPATIALLY TRIANGULATING RECEIVERS

(71) Applicant: Gerard Dirk Smits, Los Gatos, CA (US)

(72) Inventor: Gerard Dirk Smits, Los Gatos, CA (US)

(*) Notice: Subject to any disclaimer, the term of this patent is extended or adjusted under 35 U.S.C. 154(b) by 0 days.

(21) Appl. No.: 14/046,374

(22) Filed: Oct. 4, 2013

Related U.S. Application Data

(60) Provisional application No. 61/744,942, filed on Oct. 4, 2012.

(51) Int. Cl.
*G01B 11/14* (2006.01)

(52) U.S. Cl.
USPC .......................................... 356/614; 356/615

(58) Field of Classification Search
USPC ........... 356/614–615, 141.4–141.5, 140, 138; 382/103, 151, 190, 206, 291, 295, 382/312–313; 250/573, 221, 203.1; 434/324, 325, 337; 348/744, 143, 348/333.09, 333.01, 61, 341; 345/1.1–1.3, 345/156–158
See application file for complete search history.

(56) References Cited

U.S. PATENT DOCUMENTS

| | | | |
|---|---|---|---|
| 4,019,262 | A | 4/1977 | Breglia et al. |
| 5,052,820 | A | 10/1991 | McGinniss et al. |
| 5,107,122 | A | 4/1992 | Barkan et al. |
| 5,115,230 | A | 5/1992 | Smoot |
| 5,521,722 | A | 5/1996 | Colvill et al. |
| 5,559,322 | A | 9/1996 | Jacoby et al. |
| 5,572,251 | A | 11/1996 | Ogawa |
| 5,580,140 | A | 12/1996 | Katz et al. |
| 5,661,506 | A | 8/1997 | Lazzouni et al. |
| 5,812,664 | A | 9/1998 | Bernobich et al. |
| 5,914,783 | A | 6/1999 | Barrus |

(Continued)

FOREIGN PATENT DOCUMENTS

| | | |
|---|---|---|
| JP | 11119184 A | 4/1999 |
| JP | 2003029201 A | 1/2003 |

(Continued)

OTHER PUBLICATIONS

Savage, P., "GDC 2013: Valv's Michael Abrash on the challenges of VR—'A new world is emerging'," PCGamer, Apr. 2, 2013, 6 pages.

(Continued)

*Primary Examiner* — Tri T Ton
(74) *Attorney, Agent, or Firm* — Frommer Lawrence & Haug LLP; John W. Branch

(57) ABSTRACT

Embodiments are directed towards detecting the three dimensional position of a position sensing device (PSD) utilizing a spot scanned across a remote surface. A trajectory map may be determined for a projection system. The trajectory map may identify a location of the spot at various times during the scan. A PSD may be arranged with a clear view of the remote surface. The PSD may observe at least three spots projected onto the remote surface utilizing three lines of sight that enable moment-in-time linear alignment between the spot and a sensor. Observation angles between each of the lines of sight may be determined. For each observed spot, a transition time may be determined and a location of the observed spot may be determined based on the trajectory map. A position of the PSD may be determined based on determined observed locations and the observation angles of the PSD.

20 Claims, 11 Drawing Sheets

(56) References Cited

U.S. PATENT DOCUMENTS

| | | | |
|---|---|---|---|
| 6,404,416 | B1 | 6/2002 | Kahn et al. |
| 6,545,670 | B1 | 4/2003 | Pryor |
| 6,670,603 | B2 | 12/2003 | Shimada et al. |
| 6,704,000 | B2 | 3/2004 | Carpenter |
| 6,710,767 | B1 | 3/2004 | Hasegawa et al. |
| 6,766,066 | B2 | 7/2004 | Kitazawa |
| 6,982,683 | B2 | 1/2006 | Stanton |
| 7,144,117 | B2 | 12/2006 | Kojima |
| 7,232,229 | B2 | 6/2007 | Peeters et al. |
| 7,262,765 | B2 | 8/2007 | Brown et al. |
| 7,303,289 | B2 | 12/2007 | Fujiwara |
| 7,911,444 | B2 | 3/2011 | Yee |
| 8,170,329 | B2 * | 5/2012 | Seko et al. .................... 382/154 |
| 8,282,222 | B2 | 10/2012 | Smits |
| 8,297,758 | B2 | 10/2012 | Choi et al. |
| 8,430,512 | B2 | 4/2013 | Smits |
| 8,493,573 | B2 | 7/2013 | Chinn et al. |
| 8,573,783 | B2 | 11/2013 | Smits |
| 2002/0067466 | A1 | 6/2002 | Covannon et al. |
| 2003/0010888 | A1 | 1/2003 | Shimada et al. |
| 2003/0045034 | A1 | 3/2003 | Davis et al. |
| 2003/0202234 | A1 | 10/2003 | Taylor et al. |
| 2003/0202679 | A1 | 10/2003 | Rodriguez |
| 2003/0222849 | A1 | 12/2003 | Starkweather |
| 2004/0054359 | A1 | 3/2004 | Ruiz et al. |
| 2004/0218155 | A1 | 11/2004 | Schenk et al. |
| 2005/0035943 | A1 | 2/2005 | Kojima |
| 2005/0052635 | A1 | 3/2005 | Xie et al. |
| 2005/0099664 | A1 | 5/2005 | Yamaoka |
| 2005/0273830 | A1 | 12/2005 | Silver et al. |
| 2006/0028622 | A1 | 2/2006 | Nojima et al. |
| 2006/0132447 | A1 | 6/2006 | Conrad |
| 2006/0132472 | A1 | 6/2006 | Peeters et al. |
| 2006/0132729 | A1 | 6/2006 | Engle |
| 2008/0317077 | A1 | 12/2008 | Hoving et al. |
| 2009/0096994 | A1 | 4/2009 | Smits |
| 2009/0285590 | A1 | 11/2009 | Orsley |
| 2010/0002154 | A1 | 1/2010 | Hua |
| 2011/0211243 | A1 | 9/2011 | Smits |
| 2012/0132713 | A1 | 5/2012 | Chaum |
| 2012/0140231 | A1 | 6/2012 | Knox et al. |
| 2012/0187296 | A1 | 7/2012 | Hollander et al. |
| 2013/0239057 | A1 | 9/2013 | Ubillos et al. |

FOREIGN PATENT DOCUMENTS

| | | |
|---|---|---|
| WO | 2006/063577 A1 | 6/2006 |
| WO | 2009/049272 A2 | 4/2009 |
| WO | 2011/109402 A2 | 9/2011 |
| WO | 2012/054231 A2 | 4/2012 |

OTHER PUBLICATIONS

Communication Pursuant to Article 94(3) EPC in European Patent Application No. 08837063.0 mailed Dec. 27, 2011.

Communication Pursuant to Article 94(3) EPC in European Patent Application No. 08837063.0 mailed Oct. 22, 2012.

International Search Report and Written Opinion in International Patent Application No. PCT/US2008/079663 mailed Apr. 30, 2009.

International Search Report and Written Opinion in International Patent Application No. PCT/US2011/026691 mailed Oct. 24, 2011.

International Search Report in International Patent Application No. PCT/US2011/054751 mailed Jan. 30, 2012.

International Preliminary Report on Patentability in International Patent Application No. PCT/US2008/079663 mailed Jan. 25, 2010.

International Preliminary Report on Patentability issued in PCT/US2011/026691 on Sep. 4, 2012.

International Preliminary Report on Patentability issued in PCT/US2011/054751 on Apr. 9, 2013.

Official Communication for U.S. Appl. No. 12/249,899 mailed Sep. 14, 2011.

Official Communication for U.S. Appl. No. 12/249,899 mailed Mar. 13, 2012.

Official Communication for U.S. Appl. No. 12/249,899 mailed Jun. 6, 2012.

Official Communication for U.S. Appl. No. 13/037,949 mailed Nov. 2, 2012.

Official Communication for U.S. Appl. No. 13/037,949 mailed Aug. 26, 2013.

Official Communication for U.S. Appl. No. 13/605,948 mailed Dec. 31, 2012.

Official Communication for U.S. Appl. No. 13/858,762 mailed Sep. 13, 2013.

Official Communication for U.S. Appl. No. 14/048,954 mailed on Feb. 26, 2014.

* cited by examiner

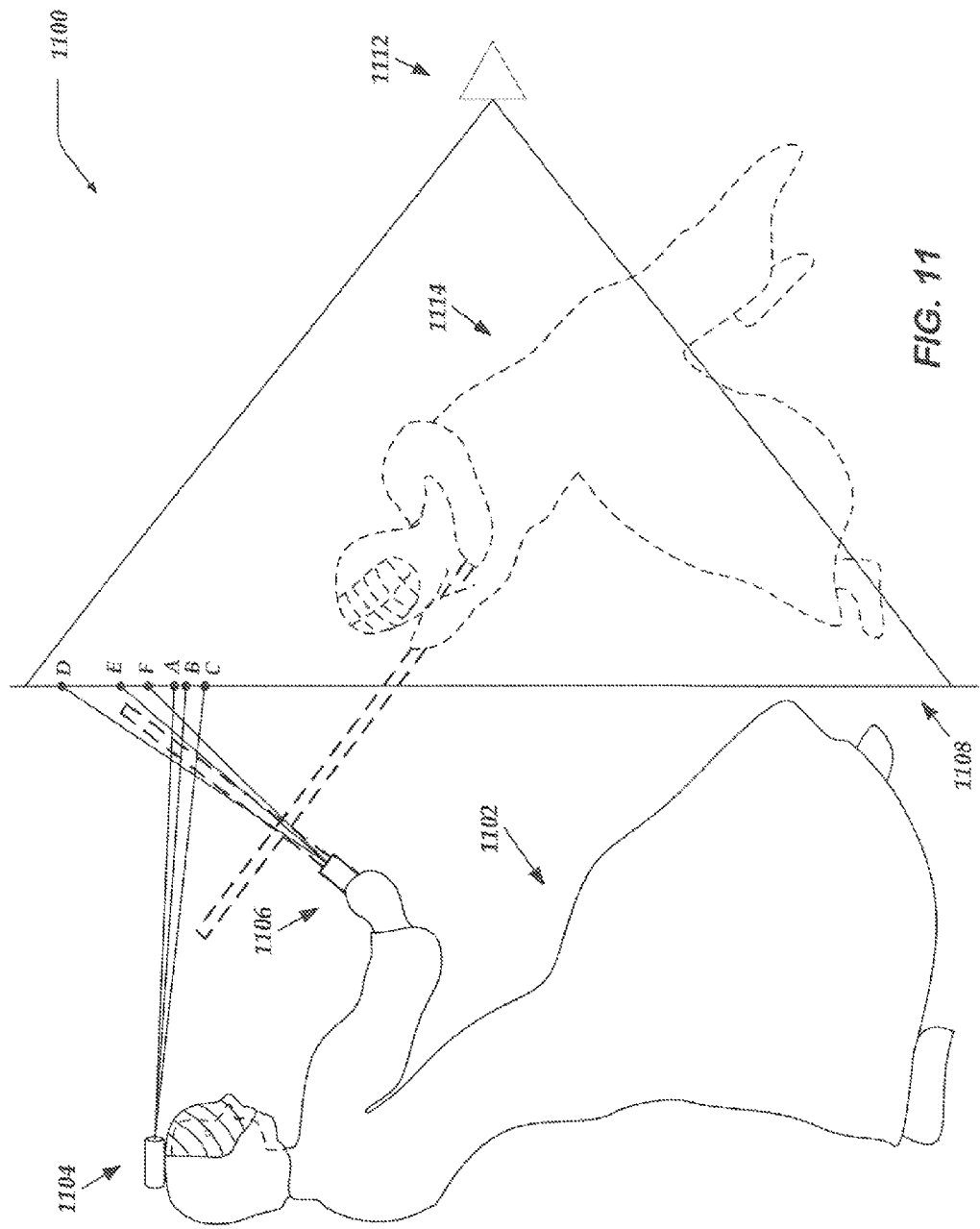

SCANNING OPTICAL POSITIONING SYSTEM WITH SPATIALLY TRIANGULATING RECEIVERS

CROSS-REFERENCE TO RELATED APPLICATIONS

This application claims the benefit under 35 U.S.C. §119 (e) of U.S. Provisional Patent Application Ser. No. 61/744,942 filed on Oct. 4, 2012, which is incorporated herein by reference.

TECHNICAL FIELD

The present invention relates generally to 3D positioning, and more particularly, but not exclusively, to employing a pixel trajectory time map of a light projection system to determine the positioning of a remote sensor.

BACKGROUND

Today, the utilization of 3D technology and virtual environments can be found in many aspects of life. Virtual environments can be utilized in video games, training simulators, or the like. However, enabling a human participant to interact with a virtual environment can be very difficult. Typically, these systems utilize cameras to capture multiple images to detect motion of the human participant. However, camera-based motion tracking systems can be ineffective due to frame rate limitations, high data volumes, and the like. Frame rate limitations can impose various artifacts in the captured images, such as blurring, which makes it difficult for these systems to accurately detect motion of the human participant. Additionally, the large amount of data associated with capturing multiple images can introduce latencies that may result in undesirable reaction times by the virtual environment to the movement of the human participant. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIGS. 10-11 show embodiments of use case illustrations utilizing a position detection system.

DETAILED DESCRIPTION

Figure 1:
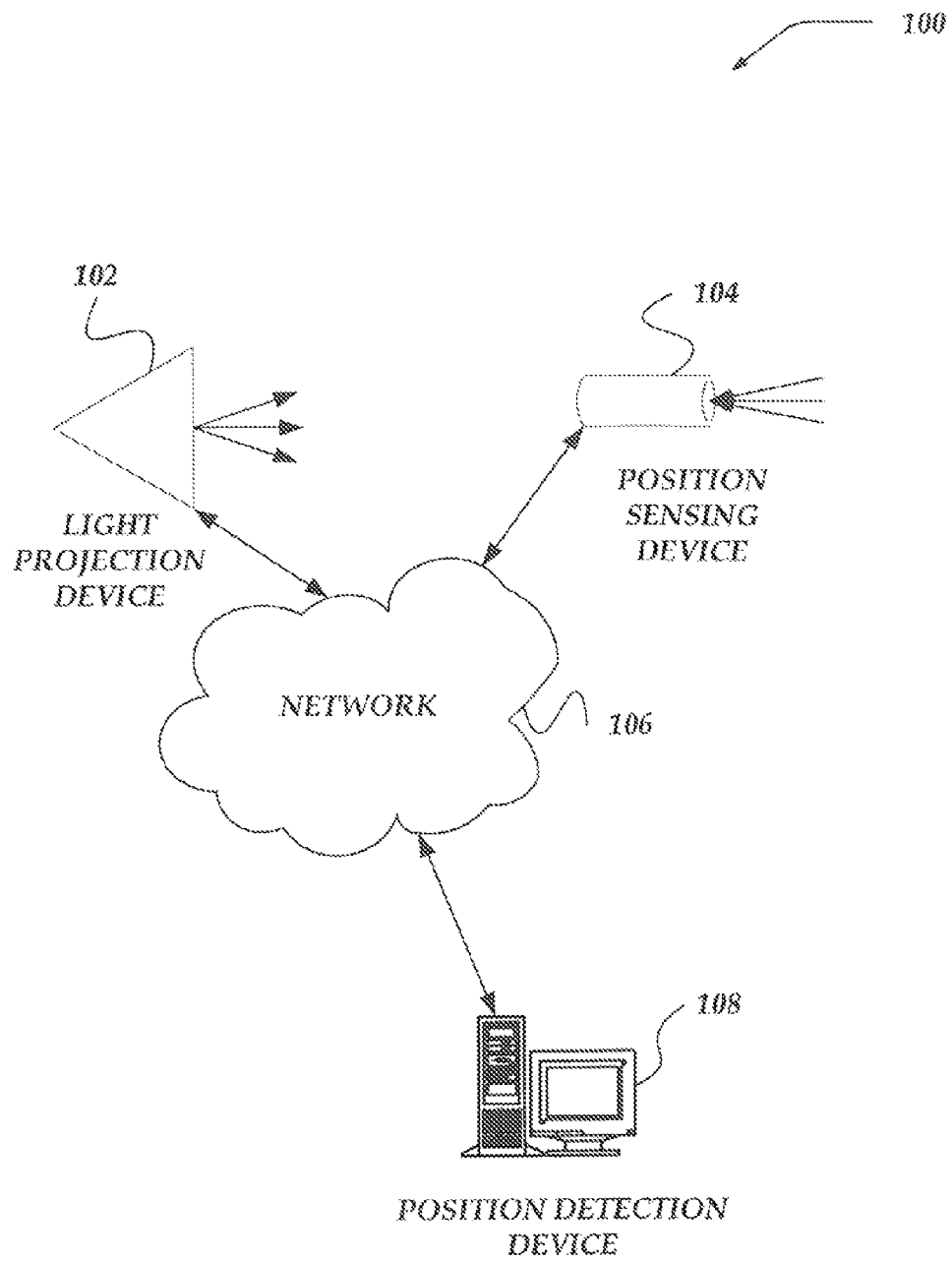
FIG. 1 is a system diagram of an environment in which embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "light projection system," "projection system," or "projection device" refers to a device arranged to project a beam onto a remote surface that sequentially scan a spot across the remote surface (also referred to as a reference surface) (where remote surface refers to a surface that is separate from one or more position sensing devices). A "spot" may refer to a point of light projected onto the remote surface from a projection beam. In some embodiments, the beam may be a laser light pulse. In various embodiments, the scanning of a spot across a remote surface may be referred to as flying spot projection. In some embodiments, the location of the spot on the remote surface (or a location within the projected image) may be known as a function of time in a pixel trajectory time map.

As used herein, the phrase "pixel trajectory time map" or "trajectory map" may identify sequential surface positions of a projected spot on a remote surface as a function of time. Every location on the remote surface may be uniquely illuminated by a projection beam at a particular point in time within a certain known time interval. This interval may be the period of time it takes to render a full image frame (typically in milliseconds), which may be referred to as a "frame". The pixel trajectory time map may include and/or identify a one-to-one mapping corresponding between unique times and surface locations of the spot. In some embodiments, the pixel trajectory time map of a beam may be employed, as described herein, to determine each location of each spot at a particular time that corresponds to each spot.

As used herein, the term "position sensing device" refers to a device arranged to observe three or more spots on a remote surface. Locations on the remote surface (or the projected image) may be determined for each observed spot. The spot locations may be determined based on a transition time for each spot. As used herein, the term "transition time" refers to a time from when the scanning of a spot on a remote surface begins to when a sensor observes a particular spot (e.g., utilizing a particulate line of sight or telescopic sight) within the scanned image.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to detecting the three dimensional position of a position sensing device utilizing a projection beam that scans a spot across a remote surface. In some embodiments, a light projection system may scan a beam across a surface to illuminate a spot across the surface over time, wherein the spot is defined by its location on the surface over time. In some embodiments, a pixel trajectory time map may be determined for the projection system. In at least one of various embodiments, the trajectory map may identify a location of the spot at various times during the scan. So, the trajectory map may include the location of the spot as a function of time.

A position sensing device (PSD) may be arranged with a clear view of the remote surface. The PSD may be employed to observe at least three spots projected onto the remote surface. In at least one of various embodiments, the three spots may be observed utilizing three lines of sight that enable moment-in-time linear alignment between the spot and a sensor. Such lines of sight may include a single sensor with multiple apertures, multiple sensors with a single aperture, or the like. In some embodiments, observation angles between each of the lines of sight may be determined. In at least one of various embodiments, these angles may be determined based on the construction of the PSD, such as the arrangement of the aperture(s) in relation to the sensor(s).

For each observed spot, a transition time may be determined. In various embodiments, the transition time may be a time from when a scan of the spot started to when the spot is observed by the sensor. In some embodiments, the pixel trajectory time map may be utilized to determine a location of each observed spot based on the corresponding transition times. A position of the PSD, with six degrees of freedom relative to the remote surface, may be determined based on the determined observed spot locations on the remote surface and the observation angles of the PSD.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes network 106, light projection device 102, position sensing device (PSD) 104, position detection device 108.

Light projection device 102 may be a device arranged to sequentially scan a spot across a remote surface (not shown), such as by employing a projection beam, where a location of the spot on the remote surface may be maintained as a function of time in a pixel trajectory time map. In some embodiments, light projection device 102 may be enabled to provide the pixel trajectory time map to each PSD 104 and/or position detection device 108. In some embodiments, the position detection device 108 might be integrated in or co-located with the PSD 104. In other embodiments, light projection device 102 may be enabled to receive transition time information from one or more PSDs 104 and may be arranged to determine a position of each PSD.

Various embodiments of PSD 104 are described below in conjunction with FIGS. 4A-4B, 8, and 9. Briefly, however, PSD 104 may be a device arranged to observe three or more spots on a remote surface. Locations on the remote surface (or the projected image) may be determined for each observed spot. The spot locations may be determined based on a transition time for each spot. In some embodiments, PSD 104 may be arranged to utilize a pixel trajectory time map to determine the spot locations based on the transition times. In other embodiments, PSD 104 may provide the transition times to another network computer, such as light projection device 102 and/or position detection device 108.

One embodiment of position detection device 108 is described in more detail below in conjunction with FIG. 2. Briefly, however, position detection device 108 includes virtually any network device capable of determining a position of PSD 104 based on a stored a trajectory map for light projection device 102 and transition times provided by position sensing device 104. In at least one of various embodiments, position detection device 108 may determine a separate position for each of a plurality of PSDs. In some embodiments, position detection device 108 may provide the positions of the PSDs to light projection device 102. In other embodiments, position detection device 108 may be an embodiment of a video game console and may modify an image to be projected by light projection device 102 (e.g., by adding virtual weapons, modifying a virtual character, or the like) based on the determined PSD positions. Devices that may be arranged to operate as position detection device 108 include various network devices, including, but not limited to personal computers, desktop computers, multiprocessor systems, microprocessor-based or programmable consumer electronics, network PCs, server devices, network appliances, and the like.

Although FIG. 1 illustrates position detection device 108 as a single computing device, the invention is not so limited. For example, one or more functions of the position detection device 108 may be distributed across one or more distinct network devices. Moreover, position detection device 108 is not limited to a particular configuration. In another embodiment, position detection device 108 may contain a plurality of network devices that operate using a master/slave approach, where one of the plurality of network devices of position detection device 108 operates to manage and/or otherwise coordinate operations of the other network devices. In other embodiments, the position detection device 108 may operate as a plurality of network devices within a cluster architecture, a peer-to-peer architecture, and/or even within a cloud architecture. Thus, the invention is not to be construed as being limited to a single environment, and other configurations, and architectures are also envisaged.

Network 106 may be configured to couple network computers with other computing devices, including light projection device 102, one or more position sensing devices 104, position detection device 108, or the like. In various embodiments, information communicated between devices may include various kinds of information, including, but not limited to, trajectory map information, transition time information, processor-readable instructions, client requests, server responses, program modules, applications, raw data, control data, system information (e.g., log files), video, audio, or the like. In some embodiments, this information may be communicated between devices using one or more technologies and/or network protocols described herein.

In some embodiments, network 106 may include various wired networks, wireless networks, or any combination thereof. In various embodiments, network 106 may be enabled to employ various forms of communication technology, topology, computer-readable media, or the like, for communicating information from one electronic device to another. For example, network 106 can include—in addition to the Internet—LANs, WANs, Personal Area Networks (PANs), Campus Area Networks (CANs), Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (IS-DNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. A network may include an optical or free space optical data communication links. In essence, network 106 may include any communication technology by which information may travel between computing devices.

Network 106 may, in some embodiments, include various wireless networks, which may be configured to couple various portable network devices, client computers, wired networks, other wireless networks, or the like. Wireless networks may include any of a variety of sub-networks that may further overlay stand-alone ad-hoc networks, or the like. Such sub-networks may include mesh networks, Wireless LAN (WLAN) networks, cellular networks, or the like. In at least one of the various embodiments, the system may include more than one wireless network.

Network 106 may employ a plurality of wired and/or wireless communication protocols and/or technologies. Examples of various generations (e.g., third (3G), fourth (40), or fifth (5G)) of communication protocols and/or technologies that may be employed by network 106 may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HS-DPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, network 106 may include communication technologies by which information may travel between light projection device 102, position sensing device 104, position detection device 108, or the like.

In various embodiments, at least a portion of network 106 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of network 106 may be modified.

Illustrative Network Device

Figure 2:
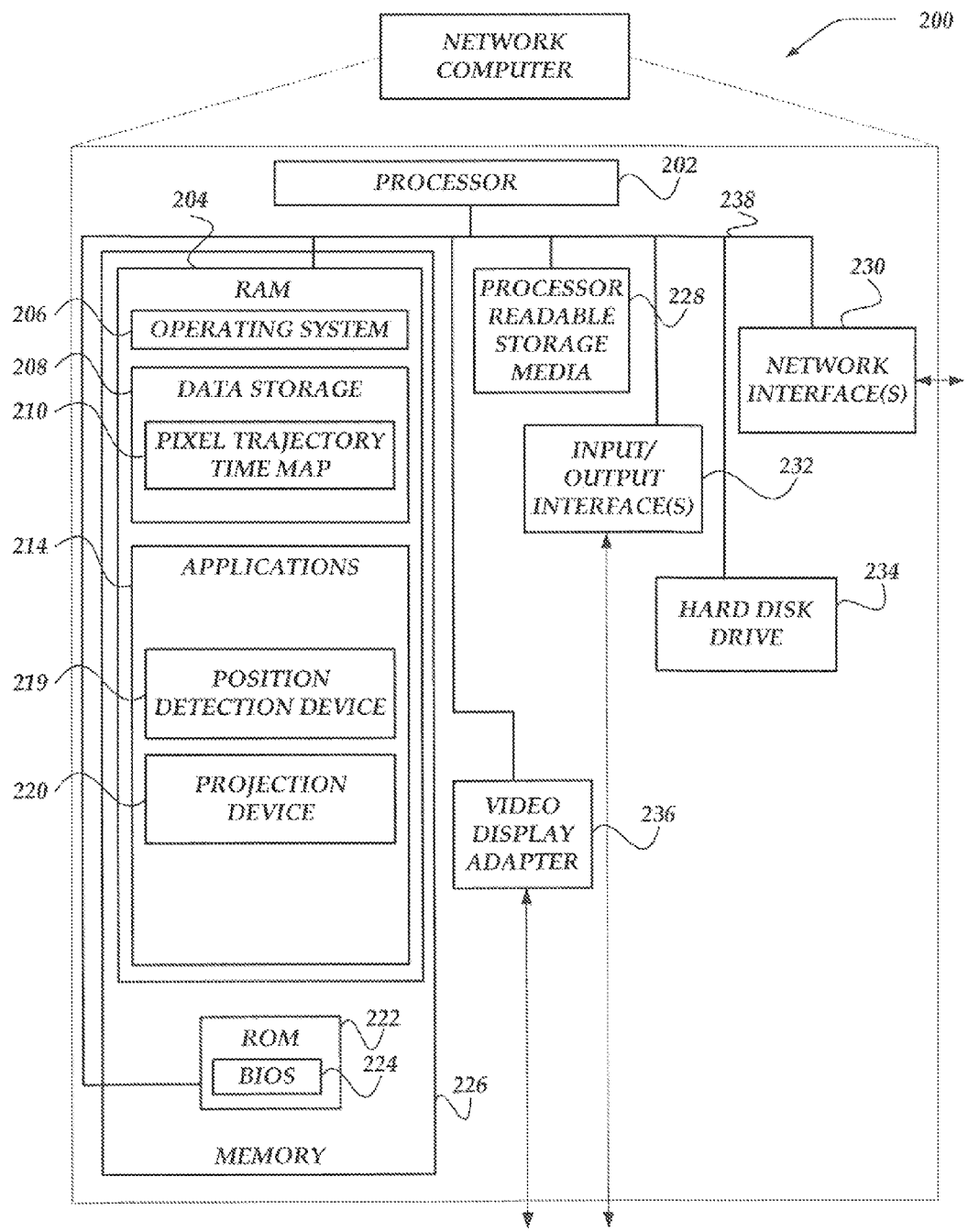
FIG. 2 shows an embodiment of a network computer that may be included in a system such as that shown in FIG. 1.

FIG. 2 shows one embodiment of a network computer 200, according to one embodiment of the invention. Network computer 200 may include many more or less components than those shown. The components shown, however, are sufficient to disclose an illustrative embodiment for practicing the invention. Network computer 200 may be configured to operate as a server, client, peer, a host, or any other device. Network computer 200 may represent, for example position detection device 108 of FIG. 1, and/or other network devices.

Network computer 200 includes processor 202, processor readable storage media 228, network interface unit 230, an input/output interface 232, hard disk drive 234, video display adapter 236, and memory 226, all in communication with each other via bus 238. In some embodiments, processor 202 may include one or more central processing units.

As illustrated in FIG. 2, network computer 200 also can communicate with the Internet, or some other communications network, via network interface unit 230, which is constructed for use with various communication protocols including the TCP/IP protocol. Network interface unit 230 is sometimes known as a transceiver, transceiving device, or network interface card (NIC).

Network computer 200 also comprises input/output interface 232 for communicating with external devices, such as a keyboard, or other input or output devices not shown in FIG. 2. Input/output interface 232 can utilize one or more communication technologies, such as USB, infrared, Bluetooth™, or the like.

Memory 226 generally includes RAM 204, ROM 222 and one or more permanent mass storage devices, such as hard disk drive 234, tape drive, optical drive, and/or floppy disk drive. Memory 226 stores operating system 206 for controlling the operation of network computer 200. Any general-purpose operating system may be employed. Basic input/output system (BIOS) 224 is also provided for controlling the low-level operation of network computer 200.

Although illustrated separately, memory 226 may include processor readable storage media 228. Processor readable storage media 228 may be referred to and/or include computer readable media, computer readable storage media, and/or processor readable storage device. Processor readable storage media 228 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 226 further includes one or more data storage 208, which can be utilized by network computer 200 to store, among other things, applications 214 and/or other data. For example, data storage 208 may also be employed to store information that describes various capabilities of network computer 200. The information may then be provided to another device based on any of a variety of events, including being sent as part of a header during a communication, sent upon request, or the like. Data storage 208 may also be employed to pixel trajectory time map 210. Pixel trajectory time map 210 may include a look-up table or other data structure that indicates a correlation between a location of a spot on remote surface (or image) as a function of time.

Data storage 208 may also include a database, text, spreadsheet, folder, file, or the like, that may be configured to maintain and store user account identifiers, user profiles, email addresses, IM addresses, and/or other network addresses; or the like. Data storage 208 may further include program code, data, algorithms, and the like, for use by a processor, such as processor 202 to execute and perform actions. In one embodiment, at least some of data store 208 might also be stored on another component of network computer 200, including, but not limited to processor-readable storage media 228, hard disk drive 234, or the like.

Applications 214 may include computer executable instructions, which may be loaded into mass memory and run on operating system 206. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 514 may also include position detection device application 219, and/or projection device application 220.

Position detection device application 219 may be configured to determine a position of one or more PSD (e.g., PSD 104 of FIG. 1). In some embodiments, position detection device application 219 may be employed by position detection device 108 of FIG. 1. In any event, position detection device application 219 may employ processes, or parts of processes, similar to those described herein.

Projection device application 220 may be configured to project a beam onto a remote surface to scan a spot across the remote surface. In some embodiments, projection device application 220 may be employed by projection device 108 of FIG. 1. In any event, projection device application 20 may employ processes, or parts of processes, similar to those described herein.

General System Description

Figure 3:
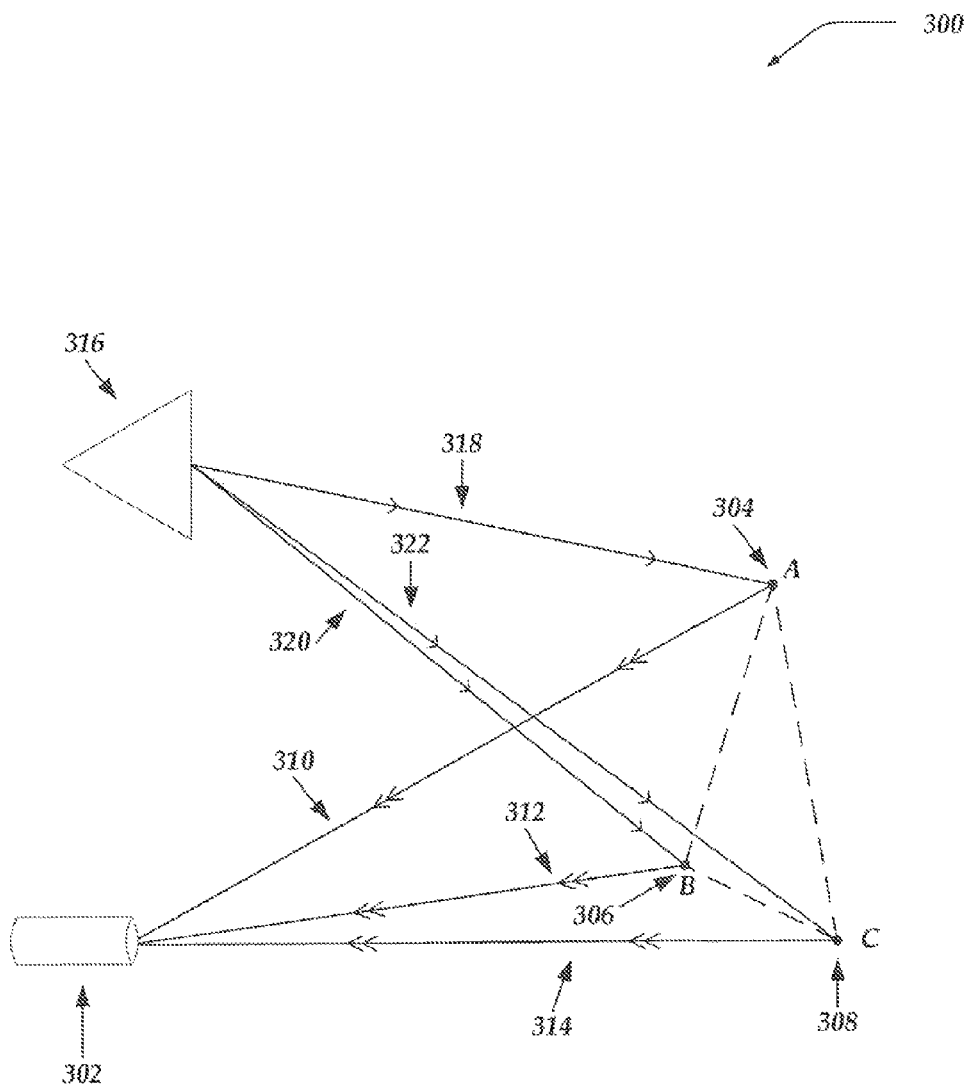
FIG. 3 illustrates an embodiment of a position detection system.

FIG. 3 illustrates an embodiment of a position detection system. System 300 may 20 include light projection system 316, position sensing device ("PSD") 302, and a remote surface (not illustrated). System 300 may also include a position detection device (not illustrated). In some embodiments, the position detection device may store a trajectory map for light projection system 316. In at least one of various embodiments, the position detection device may determine a position of PSD 302 relative to the remote surface based on the stored trajectory map and three or more transition times received from PSD 302, which is described in more detail below. In various embodiments, light projection system 316 may be arranged to provide the functionality of a position detection device.

The remote surface may be a sufficiently diffuse optical reflector (e.g., diffusely reflecting at least one of the wavelengths of the projector's beams) so that reflected light can be observed by one or more position sensing devices (e.g., PSD 302) over a wide range of observation angles (with respect to the remote surface). In various embodiments, the distance between light projection system 316 and the remote surface, an orientation of the remote surface, and/or the geometry of the remote surface may be known and/or otherwise determined (e.g., by construction, observation, or a combination thereof). For example, a laser range finder embedded into light projection system 316 may be utilized to detect the distance the projection system is from the remote surface.

In at least one of various embodiments, light projection system 316 may project a beam of light onto the remote surface. For each instance in time, the beam may project a spot onto the remote surface, which may reflect off the remote surface. Light projection system 316 may be arranged to utilize the beam to sequentially scan a spot across the remote surface (which is shown in more detail in FIG. 5).

As discussed in more detail below, PSD 302 may be arranged to observe three or more spot locations on the remote service. For illustration purposes, these observed spot locations may be spots 304, 306, and 308—which may be referred to as spots A, B, and C, respectively. Spots 304, 306, and 308 may be generated by beams 318, 320, and 322, respectively, which may represent the projected beam (from light projection system 316) at different times during a scan. So, points A, B, and C may be spots projected onto the remote surface at different times during the scan. As illustrated, solid lines with individual arrows may represent of the beam projected from light projection device 316 onto the remote surface at different times, while solid lines with dual arrows may represent a reflection of the projected beam off the remote surface at different times.

Position sensing device ("PSD") 302 may be arranged to have a clear view (i.e., an unobstructed line of sight) of the remote surface. In various embodiments, PSD 302 may be arranged to observe three or more locations on the remote surface. The observation may be achieved by a line of sight (also referred to as a telescopic sight, telescopic view, gun sight, or the like) arrangement allowing the light from each of the observed locations to be projected onto a light sensor when there is precise linear alignment between the sensor and any one of the locations observed on the remote surface. For example, PSD 302 may sense and/or otherwise observe spots A, B, and C by light reflecting off the remote surface at different points in time during the scan of the spot across the remote surface. These reflected beams from spots A, B, and C are illustrated as reflections 310, 312, and 314, respectively.

Various embodiments of PSD 302 arrangements for observing the three or more spots on the remote surface is described in more detail in conjunction with FIGS. 4A-4B, 8, and 9. Briefly, however, in some embodiments, the alignment between PSD 302 and the remote surface of may be arranged so that all of the spots may be viewable/observable, at different moments during the scan, by the same sensor within PSD 302 (e.g., see FIG. 4A). In other embodiments, a plurality of sensors may be arranged within PSD 302 such that a plurality of different spot locations may be aligned with the different sensors at different times during the scan (e.g., see FIG. 4B). In yet other embodiments, a plurality of sensing devices may be employed, where a separate sensing device may be employed for each of the observed spot locations (e.g., see FIG. 9).

Figure 4A:
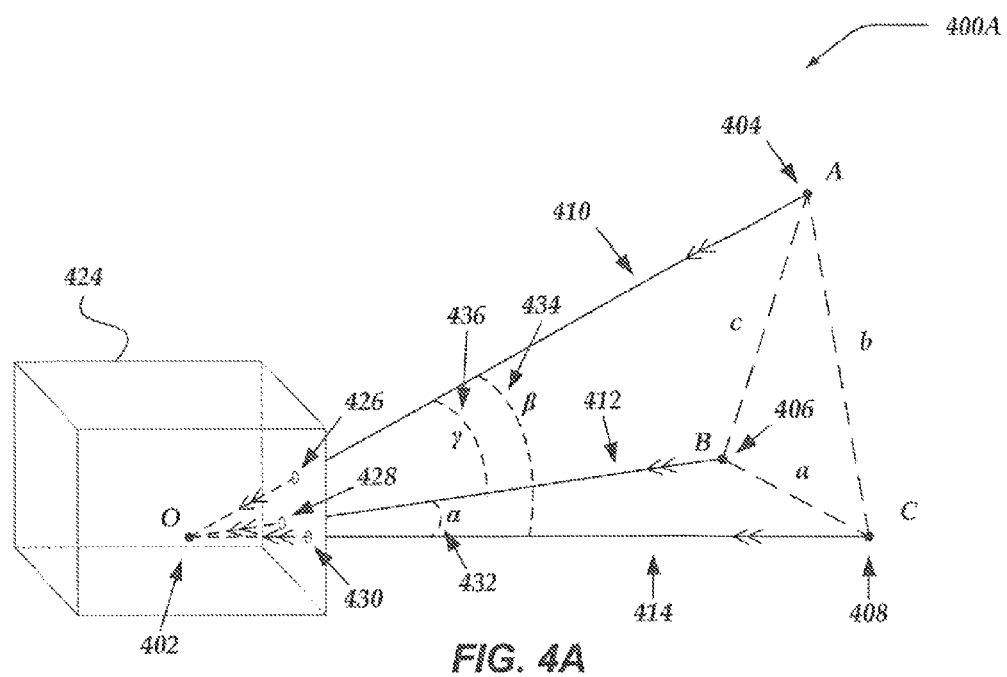
FIGS. 4A-4B show embodiments of a position sensing device.

FIG. 4A shows an embodiment of a position sensing device. Example 400A may include position sensing device (PSD) 424 observing and/or otherwise detecting reflections of spots projected onto a remote surface (not illustrated). PSD 424 may be an embodiment of a position sensing device, such as PSD 302 of FIG. 3. PSD 424 may include observation point 402 (also referred to as point O) and apertures 426, 428, and 430. Observation point 402 may be a photodiode detector, photo multiplying device (e.g., a silicon avalanche photo diode), or other device arranged to sense, detect, and/or otherwise observe a light beam (or reflection thereof) and convert it into an electrical signal.

Apertures 426, 428, and 430 may be pinholes or small openings in the housing unit of PSD 424 to enable lines of sight or clear views between observation point 402 and a plurality of spots on a remote surface. The spot on the remote surface that is in linear alignment with observation point 402 through an aperture may be referred to as an observed location. In some embodiments, the apertures may be fitted with small lenses to direct or concentrate the reflected beam to observation point 402. In some embodiments, the plurality of apertures may be situated on one or more surfaces of a housing unit of PSD 424.

In various embodiments, the sensor housing unit and the location of the apertures in the housing unit may act as a spatial filter, such that as a beam (from the light projection system) is scanned across a remote surface, a reflected beam (e.g., reflections 410, 412, and 414) from the remote surface may illuminate observation point 402 during the moment in time the beam traverses the observed location on the remote surface. At other times during the scan, the light reflecting off other locations on the remote surface may be wholly prevented from reaching observation point 402. So, in some embodiments, each aperture may separately provide a precise linear alignment between observation point 402 and one of the spot locations (e.g., spots A, B, and C) observed on the remote surface.

For example, aperture 426 may allow reflection 410 to pass through the aperture to enable observation point 402 to detect spot 404 on the remote surface. Similarly, apertures 428 and 430 may allow reflections 412 and 414 to pass through the respective apertures to enable observation point 402 to detect spots 406 and 408, respectively. In various embodiments, spots 404, 406, and 408 may be embodiments of spots 304, 306, and 308 of FIG. 3, respectively. Similarly, reflections 410, 412, and 414 may be embodiments of reflections 310, 312, and 314 of FIG. 3, respectively. In some embodiments, each of lines OA, OB, and OC—generated by reflections 410, 412, and 414, respectively—may be referred to as a line of sight (or telescopic sight for PSD 424.

In various embodiments, the construction of PSD 424 may determine observation angles between the three lines of observation from observation point 402 towards spots 404, 406, and 408. In at least one of various embodiments, the geometry of alignment between observation point 402 and apertures 426, 428, and 430 within PSD 424 may determine the observation angles. These observation angles are illustrated in FIG. 4A as angles 432, 434, and 436, also referred to as alpha, beta, and gamma, respectively. Alpha (angle 432) may be the angle between reflection 412 (i.e., line OB) and reflection 414 (i.e., line OC). Beta (angle 434) may be the angle between reflection 410 (i.e., line OA) and reflection 414 (i.e., line OC). And gamma (angle 436) may be the angle between reflection 412 (i.e., line OB) and reflection 410 (i.e., line OA). Angles alpha, beta, and gamma may be changed by adjusting the arrangement/relationship of observation point 402 within the housing unit of PSD 424 and/or the arrangement one or more of apertures 426, 428, and/or 430 in geometric relation to each other and/or to observation point 402. In some embodiments, the observation angles may be verified by various forms of calibration (e.g., by utilizing various measuring instruments to determine the various observation angles or the like).

As described herein, locations A, B, and C may be determined by utilizing a trajectory map and transition time detected by the sensor. From these locations, the position of PSD 424 may be determined from tetrahedral OABC, triangle ABC with sides a, b and c and angles $\alpha$, $\beta$ and $\gamma$.

In the system described herein, the process of taking a fix on an individual pixel position (e.g. the first triangular corner spot A) can be done in about 10 Nano seconds ($1/100,000,000$ of a second) or less. This time fixation is then followed by an immediate (or near real-time) transmission of the significant information (i.e., the time stamp/transition time), from which the pixel time map function derives the pixel's location coordinates on the projection surface. A next location (e.g. spot B, the second corner of triangle ABC) may be observed a few hundreds of microseconds later (depending on the distance between the position sensing device and the remote surface, the orientation of the lines of sight of the position sensing device, or the like). The exact moment can depend on the momentary position of this second point on the surface, which itself can depend on the orientation of the Position Sensing Device towards the surface—i.e. its pointing direction—as well as, on the projector's scan pattern.

Similarly, a third time interval (approximately 100's microseconds) may elapse before the third alignment observation occurs, such as for a spot C, a third point in the triangle ABC.

Now the exact locations of all 3 spots A, B and C has been determined by their relative time occurrences, ($t_A$, $t_B$ and $t_C$), e.g., by "looking them up" on the known surface trajectory map, which is described below in more detail in conjunction with FIG. 5. Briefly, however, a processor in the system (e.g., in the position sensing device itself, the projection system, or other position detection device) can compute the position of the point of observation O, using a mathematical algorithm to solve the 3 point pose arrangement or problem. The fully posed problem can be solved if the 3 points are in a known spatial relationship. This requirement is fulfilled when, e.g. the 3 distances AB, BC, CA, forming the 3 sides of the triangle ABC are known and at the same time the corresponding 3 observation angles (angles formed by each of 3 pairs of the lines of sight to each corner of the triangle as viewed from observation point O). These 3 observation angles AOB, BOC and COA are either determined mechanically by the construction of Position Sensing Device or they may be determined by observation during an initial calibration of the PSD, such as, for example, by placing the Position Sensing Device at a known position with respect to the scanned surface.

In some embodiments, if the projector scans at a rate of 50 frames per seconds, then it may scan successive lines within each frame at a rate of 20 microseconds per line (1000 lines/frame, 50,000 lines/sec, this may require a resonant micro-electro-mechanical system (MEMS) scan mirror with a resonant frequency of 25 kHz or higher.)

If the PSD is in motion during a scan of the spot (i.e., a single frame), that is, when there is movement of the PSD relative to the surface, the position of the second triangular spot B may shift during the time interval that has expired since the observation of the previous spot A (e.g. commensurate with a rotation or linear motion of the PSD with respect to the surface). This relative motion can be found and compensated for by a series of successive observations, as long as the successive observations are repeated at a sufficiently high rate and the PSD motion is continuous and relatively smooth, which is described in more detail below in conjunction with FIG. 6.

In other embodiments, if point A moves, e.g. one line down very fast, then the beam, same pinhole/aperture, and sensor may erroneously align a second time within the same scan period. This ambiguity can to be resolved similar to that which is described with reference to FIG. 6, by utilizing successive observations of the motion of all 3 spots, which can be employed to extract the double spot observation. (In some embodiments, a Lissajous scan may be better for the PSD purposes since the lines are not adjacent).

Although FIG. 4A illustrates three apertures arranged to observe three spot locations on a remote surface, embodiments are not so limited; rather, in some embodiments, more than three apertures may be employed. In some embodiments, the addition of more apertures/observation locations may increase the accuracy in detecting a position of PSD 424. In other embodiments, the accuracy may be increased by comparing a series of successive observations (e.g., by employing embodiments described herein to determine and comparing a plurality of transition times for each spot).

Figure 4B:
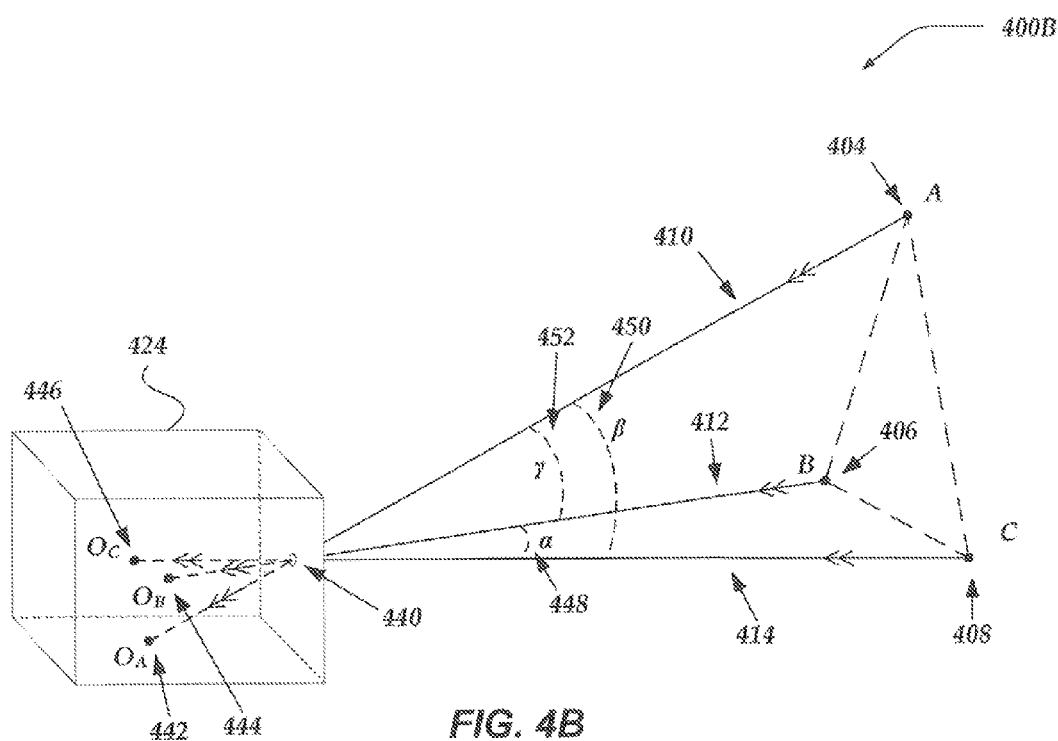

FIG. 4B shows an alternative embodiment of a position sensing device. Instead of utilizing one common photodiode detector arranged at the end of three lines of sight as illustrated in FIG. 4A, FIG. 4B illustrates the position sensing device as employing one aperture configured in a spatial arrangement that illuminates any one of three separate sensors matching three unique locations on the remote surface.

Example 400B may include PSD 424 observing and/or otherwise detecting reflections of spots projected onto a remote surface (not illustrated). PSD 424 may be an embodiment of a position sensing device, such as PSD 302 of FIG. 3. PSD 424 may include a plurality of observation points, such as observation point 442 (point $O_A$), observation point 444 (point $O_B$), observation point 446 (point $O_C$), and aperture 440. Observation points 442, 444, and 446 may be embodiments of observation point 402 of FIG. 4A.

In some embodiments, PSD 424 may include an integrated complementary metal-oxide-semiconductor (CMOS) avalanche photodiode (APD) that includes observation points 442, 444, and 446. The CMOS APD may include three or more pixels spatially arranged on a chip, or as three or more separate sensors, each capable of capturing their exact moment of alignment with the illuminated surface spots with nanosecond precision. Such a device might have built-in reference clocks to time-stamp these moments in an asynchronous manner (these time-stamps may be utilized to determine the transition times of spot observations, as described in more detail below). The sensor, amplifier, time stamp and communication functions might be integrated in a single integrated CMOS device, allowing for the complete PSD module to be miniaturized to a size of cell phone camera module (approximately 3×3×3 mm). However, embodiments are not so limited and other configurations/arrangements of multiple sensors and/or photodiode detectors may be employed as observation points 442, 444, and 446.

Aperture 440 may be a pinhole or small opening in the housing unit of PSI) 424 to enable lines of sight or clear views between observation points 442, 444, and 446 and a plurality of spots on a remote surface. In some embodiments, aperture 440 may be fitted with a small lens to direct and/or concentrate the reflected beam to the various observation points.

In various embodiments, aperture 440 and the locations of observation points 442, 444, and 446 may act as a spatial filter, such that as a beam (from the light projection system) is scanned across a remote surface, a reflected beam (e.g., reflections 410, 412, and 414) from the remote surface may illuminate each observation point during the moment in time the beam traverses the corresponding observed location on the remote surface. At other times during the scan, the light reflecting off other positions on the remote surface may be wholly prevented from reaching the observation points. So, in some embodiments, each observation point and aperture 440 may separately provide a precise linear alignment between a corresponding observation point and one of the spot locations (e.g., spots A, B, and C) observed on the remote surface.

For example, aperture 440 may allow reflection 410 to pass through the aperture to enable observation point 442 to detect spot 404 on the remote surface. Similarly, aperture 440 may allow reflections 412 and 414 to pass through the aperture to enable observation points 444 and 446 to detect spots 406 and 408, respectively. In various embodiments, spots 404, 406, and 408 may be embodiments of spots 304, 306, and 308 of FIG. 3, respectively. Similarly, reflections 410, 412, and 414 may be embodiments of reflections 310, 312, and 314 of FIG. 3, respectively. In some embodiments, each of lines $O_AA$, $O_aB$, and $O_CC$—generated by reflections 410, 412, and 414, respectively—may be referred to as a line of sight (or telescopic sight) for PSD 424.

In various embodiments, the construction of PSD 424 may determine observation angles between the three lines of observation from observation points 442, 444, and 446 towards spots 404, 406, and 408. In at least one of various embodiments, the geometry of alignment between observation points 442, 444, and 446 and aperture 440 within PSD 424 may determine the observation angles. These observation angles are illustrated in FIG. 4B as angles 448, 450, and 452, also referred to as alpha, beta, and gamma, respectively. In some embodiments, angles 448, 450 and 452 may be embodiments of angles 432, 434, and 436 of FIG. 4A, respectively. Accordingly, alpha (angle 448) may be the angle between reflection 412 (i.e., line OB) and reflection 414 (i.e., line OC). Beta (angle 450) may be the angle between reflection 410 (i.e., line OA) and reflection 414 (i.e., line OC). And gamma (angle 452) may be the angle between reflection 412 (i.e., line OB) and reflection 410 (i.e., line OA). Angles alpha, beta, and gamma may be changed by adjusting the arrangement/relationship of observation points 442, 444, and 446 in geometric relation to the location aperture 440.

Although FIG. 4B illustrates three observation points arranged to observe three spots on a remote surface, embodiments are not so limited; rather, in some embodiments, more than three observation points may be employed. In various other embodiments, combinations of FIGS. 4A and 4B may be employed, such that a plurality of observation points may be utilized with a plurality of apertures to observe three or more spots on the remote surface.

Figure 5:
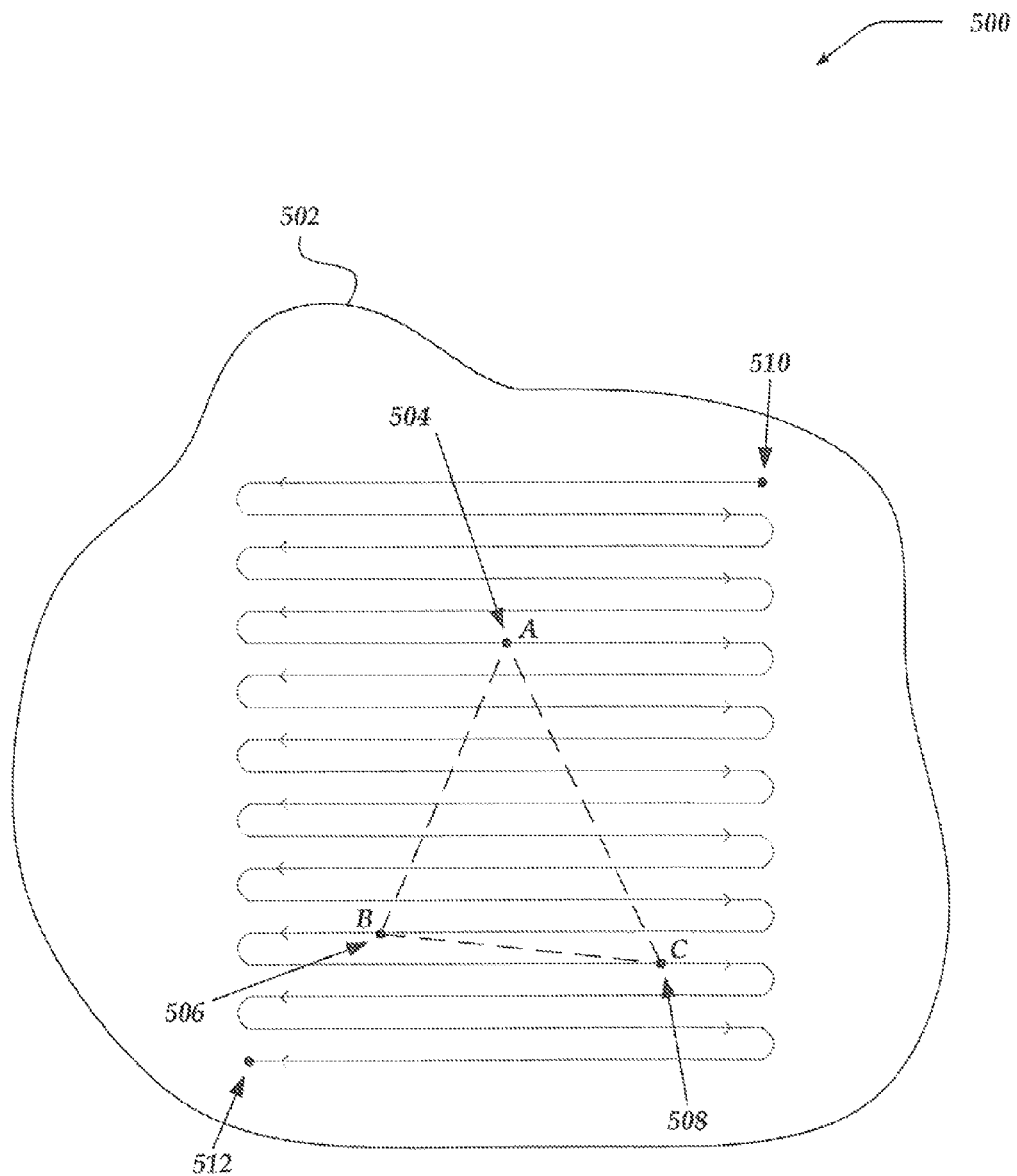
FIG. 5 shows an embodiment of a light projection system's scan pattern of a spot across a remote surface.

FIG. 5 shows an embodiment of a light projection system's scan pattern of a spot across a remote surface. In various embodiments, example 500 may include remote surface 502. A light projection system, such as light projection system 316 of FIG. 3, may scan a light beam (also referred to as a spot) across remote surface 502.

The location of the spot on remote surface 502 may be a function of time that may be known to the light projection system (e.g., light projection device 102 of FIG. 1), a position detection device (e.g., position detection device 108 of FIG. 1), or the like. In some embodiments, the spot may be moving in a predetermined pattern. For example, as illustrated, the light projection system may begin scanning the spot across remote surface 502 at location 510. As illustrated, the trajectory of the spot may be a horizontal back and forth pattern (similar to a raster pattern) across remote surface 502, ending at location 512. In at least one of various embodiments, as the spot is scanned across remote surface 502, spots 504, 506, and 508 may be projected onto remote surface 502 at different times and may correspond to the observed locations by a PSD. In some embodiments, spots 504, 506, and 508 may be embodiments of spots 304, 306, and 308 of FIG. 3, respectively. The movement pattern of the spot as a function of time may result in a pixel trajectory time map (or trajectory map) of the spot across the remote surface.

In various embodiments, the trajectory map may include a two or three dimensional coordinates of each spot location for each time segment. So, in some embodiments, there may be a one-to-one mapping of unique times (t) and a coordinate location of the spot on the remote surface.

Although a predetermined horizontal scan pattern is illustrated, embodiments are not so limited. And other predetermined scan patterns and/or unknown/random patterns may be utilized. For example, in some embodiments where the spot pattern is unknown and/or random, the exact trajectory of the spot may be observed and/or otherwise determined. In at least one of various embodiments, the spot trajectory may be determined by the projection system. In other embodiments, the spot trajectory on the remote surface may be determined by employing a spot location sensing device (e.g. a camera, linear sensor arrays, or the like). In at least one such embodiment, the spot's instantaneous location on the remote surface (which may be referred to as a screen position of the spot) can be determined by observing the movement of the spot on the remote surface as a function of time. This observed movement may result in the pixel trajectory time map of the spot across the remote surface.

In some embodiments, the trajectory map (i.e., the pixel trajectory time map) may be provided (e.g., broadcast) to one or more position sensing devices. In at least one such embodiment, each position sensing device may be arranged to employ the trajectory map to determine the three or more observed locations of the beam, such as by comparing transition times (t) (described in more detail below) against the trajectory map. In some other embodiments, the trajectory map may be broadcasted, without using any RF signals, by encoding the surface trajectory mapping function optically within the laser scan pattern in such a way that it can be decoded by each of the PSDs. Information about the beam location and time references may be embedded in the light source by modulation of intensity, wavelength, and/or phase. Thus the map or additional detail of the scanning pattern can be encoded in the beam itself. This allows the position sensing devices to fully determine their position without requiring an additional channel of communication.

In other embodiments, the trajectory map may be maintained by the projection system, and each position sensing device may provide the transition times (which may, in some embodiments, be determined based on a comparison of time stamps of when the PSD observed the spots to the time of the scan) to the projection system, which can then utilize the trajectory map and the received transition times to determine the position of the position sensing device. In yet other embodiments, a position detection device separate from the projection system may store the trajectory map and may be employed to determine the position of the position sensing device. In various embodiments, the signals provided by each PSD to a common point (e.g., the projection system, position detection device, or other central system node) may be encoded (label) with a unique ID. The unique IDs of each PSD may enable the common point to correctly associate incoming data with each PSD. In some other embodiments, each PSD may include their own accurate time reference, which may be utilized to encode the pulse receive time (time stamp) digitally so that the information can be sent asynchronously without a loss of accuracy.

In any event, the projection system may start scanning a spot across remote surface 502 at time (t) equals 0 (e.g., at location 510). As the spot is scanned across remote surface 502, if a reflection of the spot (i.e., a beam reflection) aligns with one of the lines of sight (e.g., observation of spot A through aperture 426 of FIG. 4A) of the position sensing device, then a transition time (t) and/or duration (delta t or $\Delta t$) of when the sensor (e.g., observation point 402 of FIG. 4A) detects/observes the spot may be determined.

In some embodiments, the sensor receives some of the light reflecting off the remote surface from the spot location while the spot is aligned with the line of sight. During this alignment of the sensor and the particular surface location (which may be referred to as an illuminated time interval, or $\Delta t$), the reflected beam illuminates the sensor (typically a few nanoseconds) signaling the moment the scanning projection beam traverses the observed location. The sensor may convert the beam into an electrical signal or pulse, which may be proportional in transition time (t), intensity, and/or duration ($\Delta t$) to the optical signal received by the sensor through the line of sight.

For example, when the beam reaches spot 504, the sensor (e.g., observation point 402 of FIG. 4A) receives some of the light reflecting off the surface from that location and may generate an electrical signal. This electrical signal may be received by the projection system or other position detection device and a transition time for that observation by the sensor may be determined, e.g., $t_A$. Similarly, the sensor may observe spots B and C, which may result in the position sensing device providing an electrical signal at transition times $t_B$, and $t_C$. Utilizing the illustration of FIG. 5, the determined transition times that the spot may align with a line of sight of the position sensing device may be represented as $t_A$, $t_B$, and $t_C$. In some embodiments, the signal provided by the sensor to the projection system may be a function of t and $\Delta \Delta t$ for each observed spot.

In some embodiments, the position sensing device may provide the generated signal to the projection system, which can then determine the transition time. In at least one of various embodiments, the provided signal may be delayed for a few nanoseconds due to the time it takes the light to reach the sensor, be converted to the electrical signal, and provided to the projection system. In other embodiments, the position sensing device itself may determine and record the transition times. In various embodiments, the transition times for each of the lines of sight of a position sensing device may be determined for a single scan period or frame (e.g., $t_A$, $t_B$ and $t_C$ for spots A, B, and C in FIG. 5, respectively). Accordingly, if multiple position sensing devices are employed, then three or more transition times may be separately determined for each position sensing device. In some embodiments, transition times may be determined for each frame, while in other embodiments, transition times may be determined every few frames.

As indicated above, each transition time may correspond to a unique location of the spot on the remote surface. Employing the scan pattern's trajectory map as a reference, the spatial coordinates of the three or more locations on the remote surface may be determined from the observed transition times (e.g. by a look-up table or a geometric algorithm). Based on the determined observed locations and the known observation angles of the lines of sight of the position sensing device (described above as alpha, beta, and gamma), the position of the observation point (e.g., observation point 402 of FIG. 4A or aperture 440 of FIG. 4B) relative to the remote surface may be determined, such as, in some embodiments, by solving the three point perspective pose problem or "P3P" problem. One of ordinary skill in the art would understand how to solve the P3P problem utilizing the determined observed locations and the observation angles. Utilizing the trajectory map, transition times, and the observation angles, a complete 3D position coordinate information (six degrees of freedom) set of a PSD may be determined. So, the position of the PSD (relative to the remote surface) can be determined in the x, y, and z directions, as well as the pitch, yawn, and roll of the PSD. By observing spot locations for a plurality of separate scans, the position and motion of the PSD may be determined in near real-real time in conjunction with the projected image.

As described above, a plurality of PSDs may be employed, and a position of each PSD may be determined based on the corresponding transition times, corresponding observation angles, and the trajectory map (which may be the same for calculating the position of each PSD).

Using the trajectory map (which may be broadcast to multiple position sensing devices), a highly distributed, robust and scalable positioning system can be implemented with a plurality of position sensing devices. Each position sensing device may independently determine their exact positions with respect to a common reference surface (e.g., the remote surface from which the beam is projected. In some embodiments, the projection system (or other positioning detection system) may determine the location of the position sensing devices. In other embodiments, the projection system may not be aware of the position sensing devices, but that the position sensing devices and the projection system share a view on the reference surface.

Figure 6:
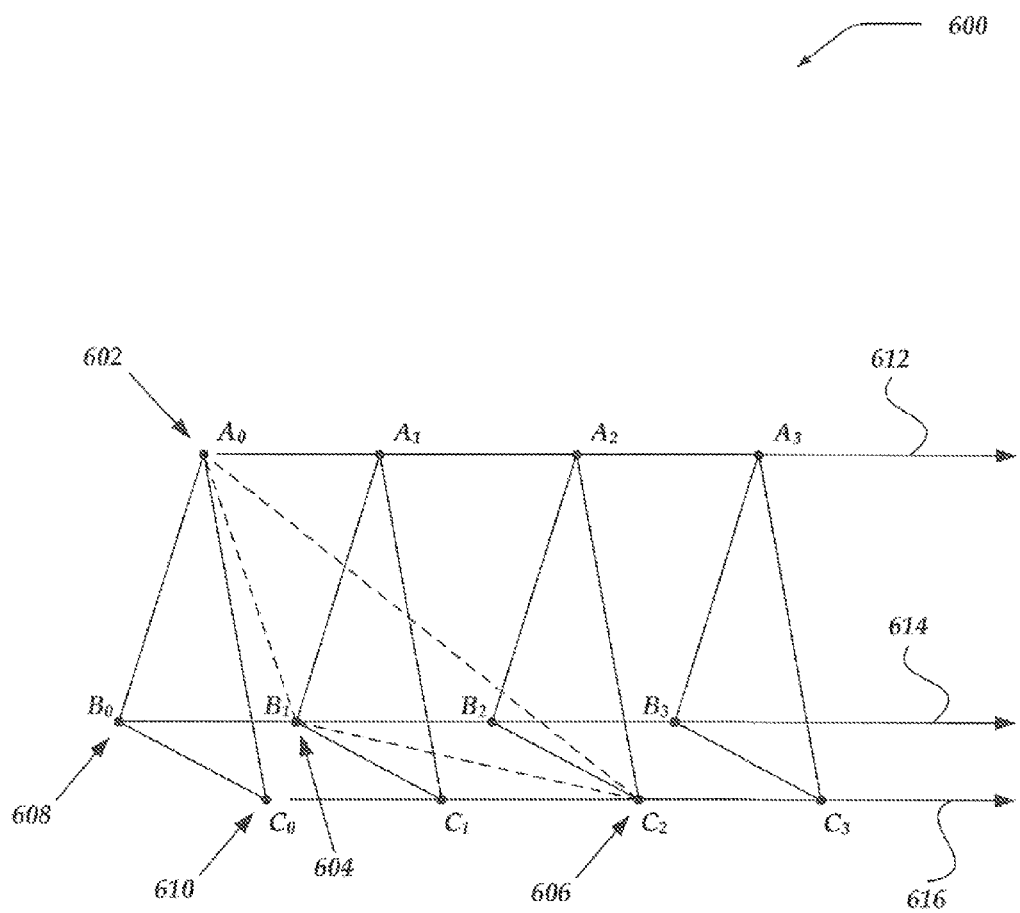
FIG. 6 illustrates an embodiment of spot location compensation for position sensing device motion.

FIG. 6 illustrates an embodiment of spot location compensation for position sensing device motion. In some embodiments, the position of a PSD (e.g., PSD 302 of FIG. 3) may change during a single scan (i.e., one frame) of the spot across the remote surface. Accordingly, in some embodiment, since spots A, B, and C (as shown in FIG. 3) are not observed at the same time, the motion of the PSD between location fixes A, B and C should be compensated for to avoid a position determination error. As the PSD moves during a scan, the PSD may observe spots 602, 604, and 606; rather than the correct locations of spots 602, 608, and 610. So, distorted triangle $A_0B_1C_2$ may be incorrectly determined which could result in an incorrect position determination of the PSD.

Embodiments described herein to determine the transition times of spots A, B, and C may be employed across multiple frames (i.e., multiple scans). In at least one such embodiment, a series of separate transition times may be determined for each spot. From each of these time series, corresponding locations for each transition time may be utilized to determine a trajectory of each spot. For example, a trajectory of spot A (trajectory 612) may be determined based on the observed locations $A_0, A_1, A_2, A_3$, and so on. A trajectory of spot B (trajectory 614) may be determined based on the observed locations $B_1, B_2, B_3$, and so on. A trajectory of spot C (trajectory 616) may be determined based on the observed locations $C_2, C_3$, and so on. Based on trajectory 612, 614, and 616, locations $B_0, C_0$, and $C_1$ may be estimated. And estimations of triangles $A_0B_0C_0$, $A_1B_1C_1$, and $A_2B_2C_2$ may be reconstructed. These individual time series, so called "structure from motion" machine vision techniques may enable a precise estimation of trajectory and pointing directions of the observation point (e.g., observation point 402 of FIG. 4A) during the movement of the PSD.

General Operation

The operation of certain aspects of the invention will now be described with respect to FIG. 7. In at least one of various embodiments, processes 700 may be implemented by and/or executed on one or more computing devices, such as network computer 200.

Figure 7:
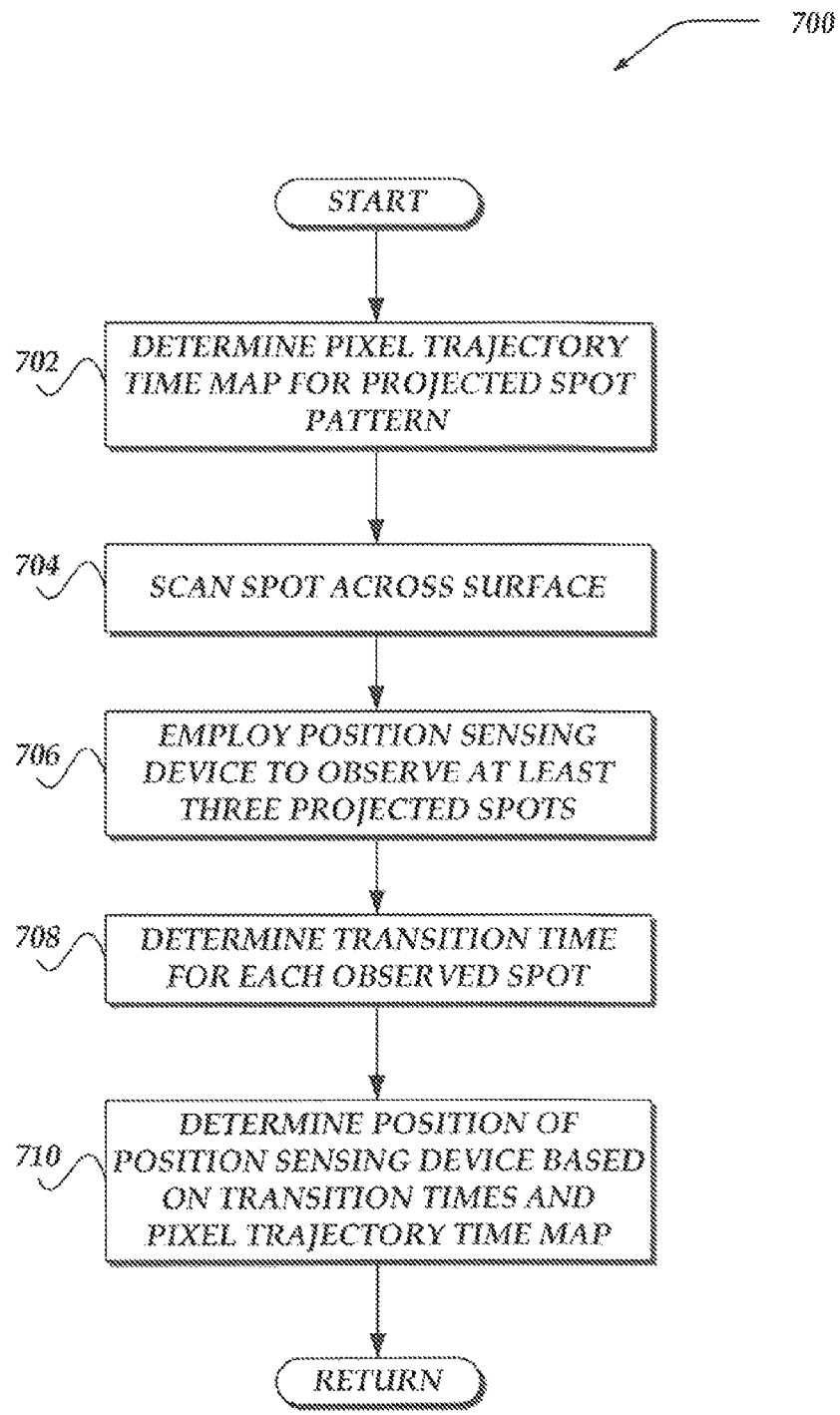
FIG. 7 illustrates a flowchart generally showing an embodiment of determining a position of a sensor.

FIG. 7 illustrates a logical flow diagram generally showing an embodiment of determining a position of a sensor. Process 700 may begin, after a start block, at block 702, where a pixel trajectory time map may be determined for a projection system. In some embodiments, the trajectory map may be determined based on a determined pattern (from either a known pattern or constructed from an unknown pattern) of a spot projected on a remote surface. The trajectory map may include a time v. spot location for each point in time during a scan of the spot across the remote surface.

Process 700 may proceed to block 704, where a spot may be scanned across a remote surface by the projection system. In at least one of various embodiments, a distance between the remote surface and the projection system may be determined.

Process 700 may continue at block 706, where a position sensing device may be employed to observe at least three spots projected onto the remote surface. In at various embodiments, the three spots may be observed utilizing three lines of sight that enable moment-in-time linear alignment between the spot and a sensor. Such lines of sight may include a single sensor with three apertures, multiple sensors with a single aperture, a combination thereof, or the like. In some embodiments, observation angles between each of the lines of sight may be determined. In at least one of various embodiments, these angles may be determined based on the construction of the position sensing device, such as the arrangement of the aperture(s) in relation to the sensor(s).

Process 700 may proceed next to block 708, where a transition time may be determined for each observed spot. In various embodiments, the transition time may be a time from when a scan of the spot started to when the spot is observed by the sensor.

Process 700 may continue next at block 710, where a position of the position sensing device may be determined based on the transition times and the pixel trajectory time map. In at least one of various embodiments, the location of each spot on the remote surface (i.e., the surface the spot/image is projected onto) or on the projected image may be determined. In some embodiments, the trajectory map may be utilized as a loop-up table to determining the location of each spot based on the corresponding transition time for the spot. However, embodiments are not so limited and other data structures and/or algorithms may be employed to determine the spot locations from the trajectory map utilizing the transition times.

Based on the location of each observed spot and the observation angles of the position sensing device, a position (with six degrees of freedom) of the position sensing device may be determined relative to the remote surface (or the projected image).

After block 710, process 700 may terminate and/or return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Alternative Embodiments

Figure 8:
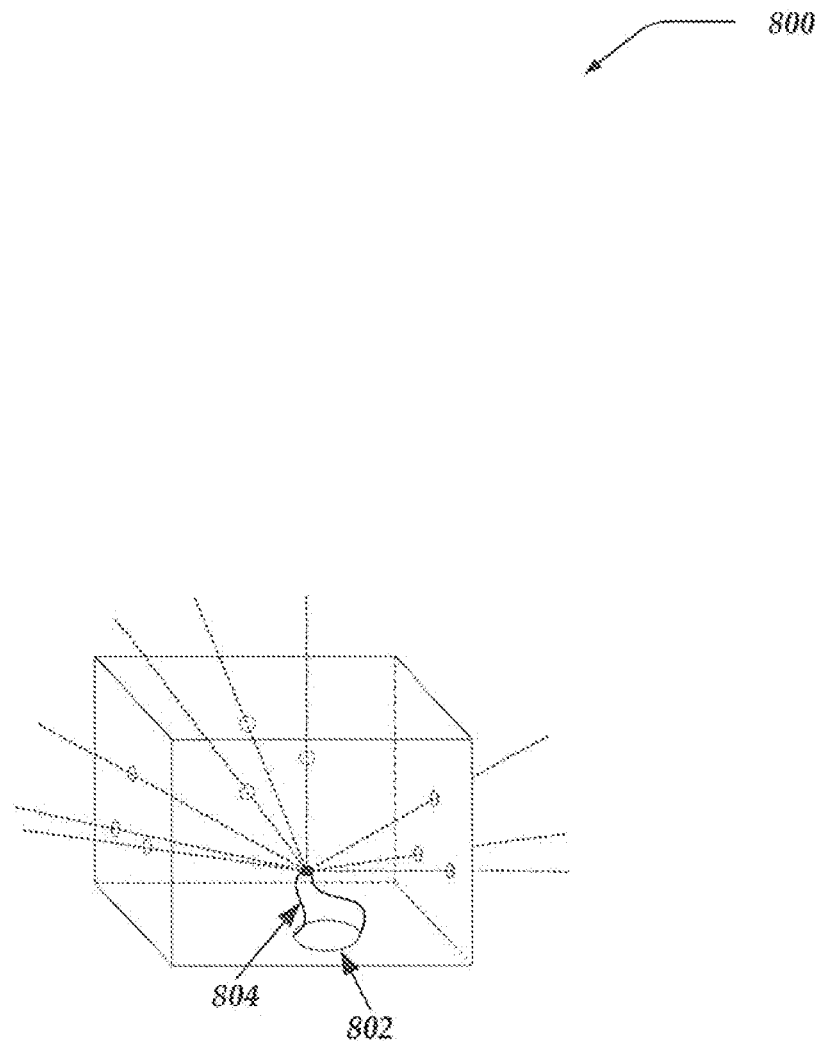
FIGS. 8-9 show alternative embodiments of a position sensing device.

FIG. 8 shows an alternative embodiment of a position sensing device. Example 800 may be a molded structure (e.g., molded plastic structure) with a plurality of PSDs that may enable positioning of the PSD through any of the illustrated cubic object's six faces (although only three PSDs for three faces is illustrated for clarity). In various embodiments, one or more faces of a multi-faced (multi-sided) object can include a separately embedded PSD that may be arranged to determine a position of the object through a corresponding face/side. In some embodiments, the observed light through one of the lines of sight from any of the PSDs may be channeled through waveguide 804 to a central common detector array (e.g., detector array 802). Detector array 802 may include a plurality of pixels for each separate PSD. This allows a single inexpensive integrated detector to be used for the PSD functions in multiple faces/directions.

Figure 9:
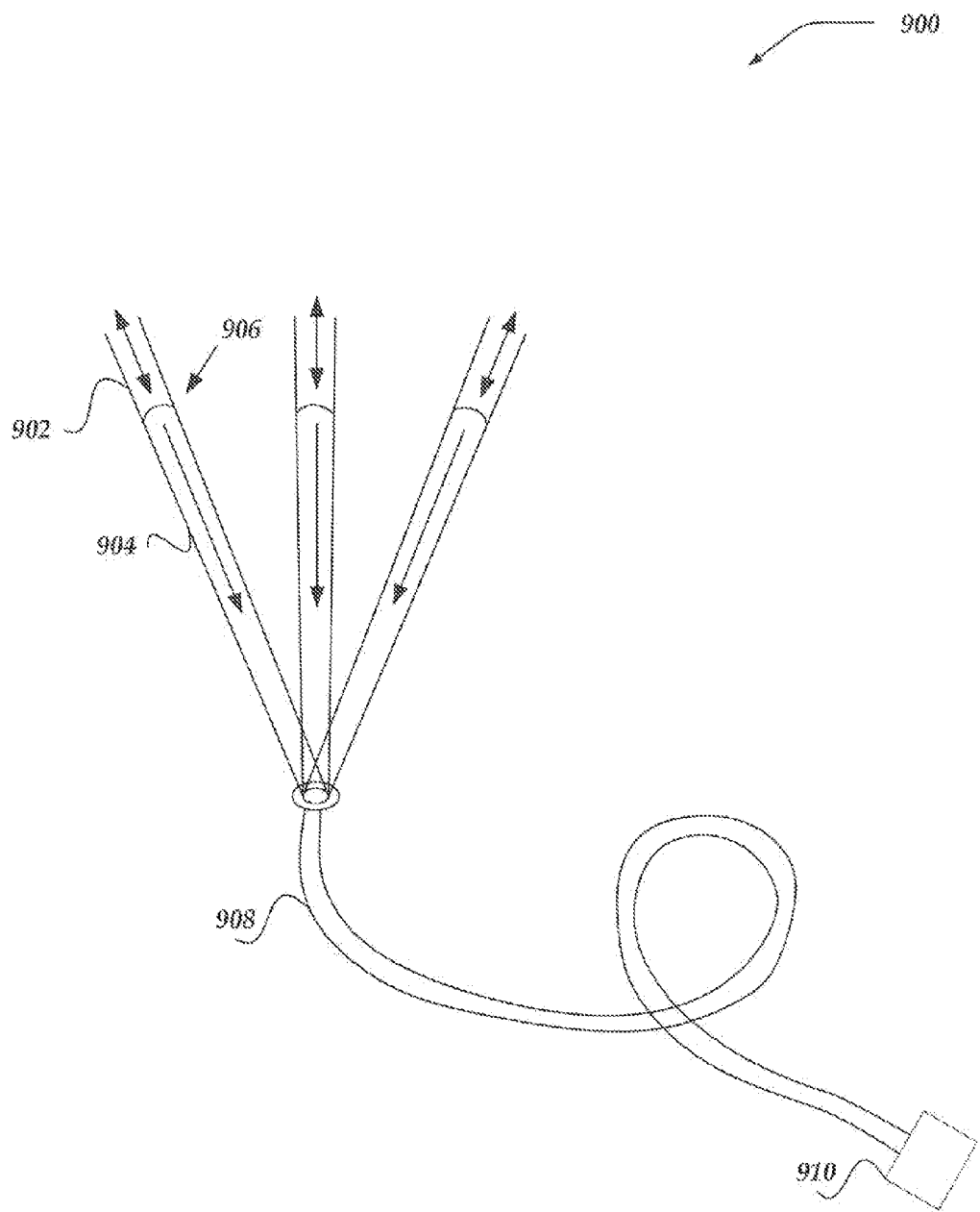

FIG. 9 shows an alternative embodiment of a position sensing device. Example 900 may be an optically tethered PSD (which may be referred to as a 3D light pen with 6 Degrees of Freedom input device). Example 900 may include a plurality of optical waveguides, fiber bundle 908 and sensor 910. Each optical waveguide may include a lines of sight (e.g., lines of sight 902) connected to a corresponding optical fiber (e.g., fiber 904). The lines of sight may be enabled to collect light through a lens aperture (e.g., lens 906) and channel the light into the optical fiber. Fiber bundle 908 may include a single fiber that can channel light from any of the optical fibers for the optical waveguides towards sensor 910 at a remote location to the waveguides. In other embodiments, fiber bundle 908 may include a separate optical fiber for each optical waveguide. Sensor 910 may include one or more sensors or observation points, as described herein, to determine the transition times between observed spots on a remote surface. In various embodiments, a plurality of PSD functions can be connected via optical waveguides fiber bundles, molded waveguide structures, or the like.

Use Case Illustrations

Figure 10:
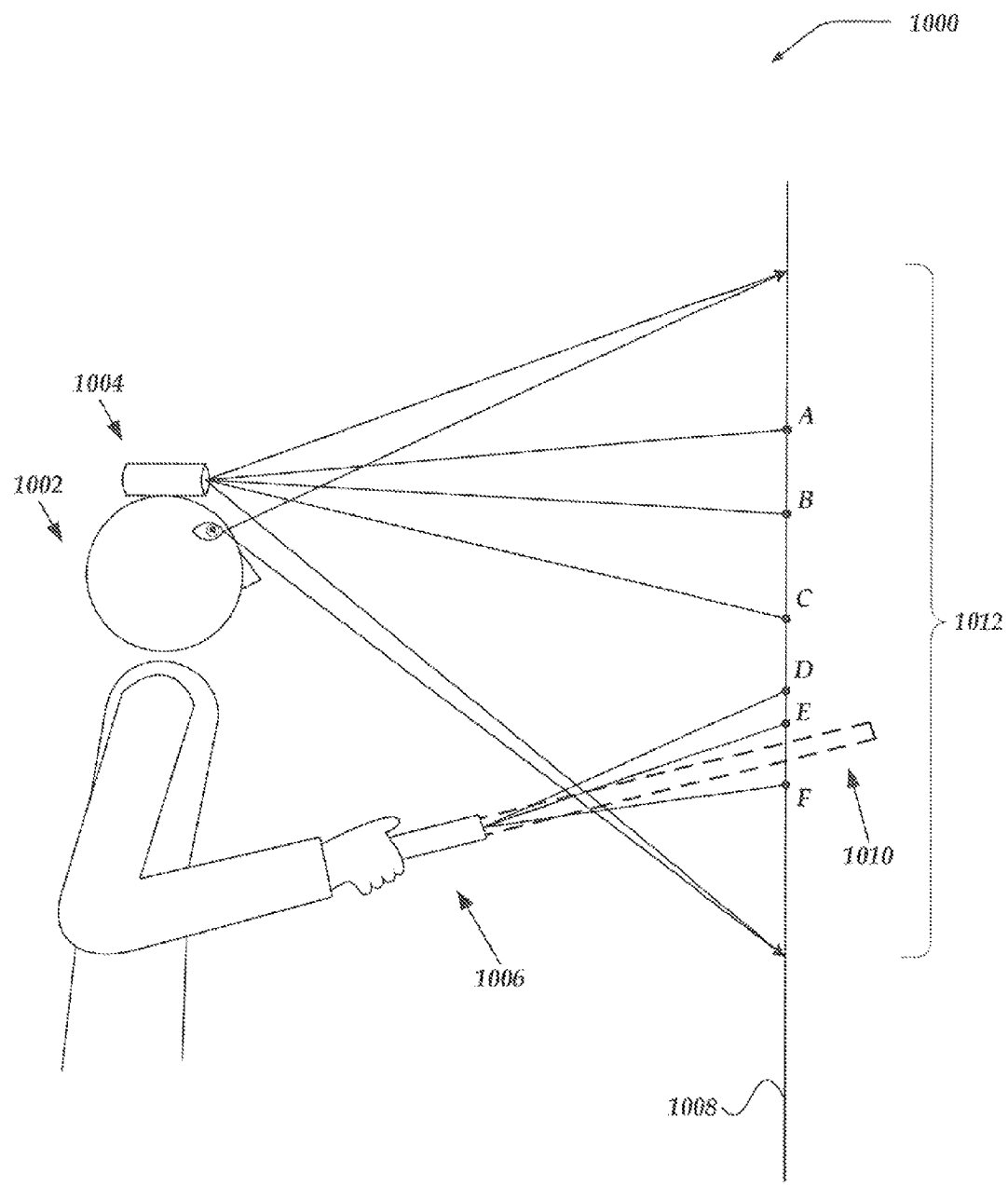

FIG. 10 shows an embodiment of a use case illustration utilizing a position detection system. Example 1000 may include projection surface 1008 (e.g., a screen) and human player 1002. Human player 1002 may face projection surface 1008. Projection surface 1008 may be a screen on which a scanning laser projects an image using a flying spot image projection. The projection can be from the front, rear, from above or from the side.

Human player 1002 may wear a head mounted tracking device 1004 and may hold saber handle 1006 (or "hilt") in his/her hand. Head mounted tracking device 1004 and saber handle 1006 may be embodiments of separate PSDs as described herein.

Employing embodiments described herein, head mounted tracking device 1004 may enable tracking of player 1002's perspective of projection surface 1008 (perspective 1012), such as by observing points A, B and C on projection surface 1008.

Similarly, embodiments described herein may be employed to track, with six degrees of freedom, saber handle 1006. By tracking the position of saber 1006, a "laser blade" (1010) can be virtually added to the projected image to appear attached to the hilt of saber 1006.

For example, the saber handle (a Position Sensing Device shaped like a light saber hilt) may include three (or more) small apertures that align with three spots D, E, and F on the surface of projection surface 1008. The sensor in the Position Sensing Device sees the scanning beam at three distinct moments during each scan ($t_D$, $t_E$ and $t_F$), which may be utilized to determine the position and orientation (all 6 Degrees of Freedom) of the "light saber" with respect to projection surface 1008. A "virtual" image of the "flaming" laser blade (e.g., blade 1010) can be added to the image on the screen with the laser beam emanating from the saber's "hilt." The image can be adjusted and/or for the viewpoint of the holder of the sword (based on the tracking of player 102 and saber 1006) in real time as the player moves around in front of the screen and swings the saber handle.

In some other embodiments, the patterns on the screen might be projected by the headset of the player (e.g., head mounted tracking device 1004). The scan pattern serving as position reference beacon can be implemented by adding an additional invisible primary (e.g. from an IR or UV laser source) to an existing scanning image projection system. When a retro-reflective surface is used for visible light, this surface may be designed so that the light used for position tracking is diffused (unlike the visible light) so that it can be seen at positions substantially away from the projection source. That is, the surface may be coated to diffuse a certain infrared (or UV) wavelength, making the reflection pattern for select wavelengths more like a regular projection screen.

FIG. 11 shows an embodiment of a use case illustration utilizing a position detection system. Example 1100 may be an embodiment of example 1000 of FIG. 10. Example 1100 may include projection surface 1108 (e.g., a screen) and human player 1102. Human player 1102 may face projection surface 1108. Projection surface 1108 may be an embodiment of projection surface 1008 in FIG. 10, where projector 1112 projects the image onto the screen. Virtual opponent 1114 may be projected in stereoscopic 31) on a rear projection screen.

Human player 1102 may wear a head mounted tracking device 1104 and may hold saber handle 1106 (or "hilt") in his/her hand. Head mounted tracking device 1104 may be an embodiment of head mounted tracking device 1004 of FIG. 10. And saber handle 1106 may be an embodiment of saber handle 1006 of FIG. 10.

By employing embodiments described herein, player 1102 may be enabled to fight virtually with a light saber Kendo style sword against virtual opponent 1114. Player 1102's view may be tracked by head mounted tracking device 1104 (e.g., by tracking points A, B, and C), and his/her saber handle 1106 may be tracked (e.g., by tracking points D, E and F). Tracking of player 1102 and saber handle 1106 may be utilized to modify the virtual environment, including, but not limited to, the location of an avatar of player 1102, movement of virtual opponent 1114 in response to the player's movement, or the like.

Additional System Information

The embodiments described herein may have advantages over other systems. Such an advantage may be, for example, motion accuracy. For example, sport simulations, such as table tennis, can require fast reflex responses from a player. Accordingly, motion capture response latency should be minimal for the resulting simulation to feel real to the player. In some situations, returning a hard serve can requires a response within a thousandth of a second and a racquet positional accuracy of millimeters. in one example, a ball moving at 30 meters per second will move 30 millimeters in one millisecond. With a tracking system using a camera at 30 frames per second, the ball will move one meter from frame to frame. The traditional method of "freeze-framing" the motion with captured images—e.g., capturing the whole field of view simultaneously as in one huge parallel array of pixels—can introduce significant position, time, and velocity ambiguity. Images may be blurred, because even at a shutter speed of $\frac{1}{1000}$ of a second, the ball in the previous example moves 30 mm within each frame.

Each additional pixel can add to the required photon budget. In some situations, small pixels require a strong strobe illumination. Motion accuracy in a camera-based system is typically a zero sum game, e.g. the alternative to stronger strobes is using larger lenses—larger apertures capturing more light. But this greater aperture can reduce the effective depth of field, which in a 3D system may cause unacceptable levels of focal blur. A conventional camera-based motion capture system generally requires sharp, high resolution images, without motion blur and an acceptable depth of field. Ultimately, further incremental improvement in resolution can require short exposures with excessively intense strobe illumination. So, to illuminate 2 million pixels at the same time, so that each pixel receives enough photons, stronger strobe pulses may be impractical, as well as highly inefficient.

The alternative to previous camera systems may be embodiments described herein. For example, the sequential "flying spot" laser projector can deliver much greater peak intensity (up to 2,000,000×) to a single pixel position of interest (e.g. spots A, B and C of FIG. 3 being observed on the remote surface). And this peak intensity may be on the remote surface for the briefest of moment of time (e.g., nanoseconds, which ensures that the total energy exposure level is still within eye-safety limits). The greater peak intensity and shortness of required time can greatly extend the accuracy range for motion capture.

In a camera-based motion tracking system, added spatial resolution typically means more pixels per frame. A 1 M (1000×1000) pixel frame contains up to 3 Mbytes of data. Camera systems thus create a "digestive challenge" for the communications and processing systems downstream from it, potentially causing Gigabyte-size log jams. This large amount of data communication can require complex compression schemes that can introduce additional and often unpredictable latencies, typically resulting in even more motion ambiguity.

An advantage of the time-based sequential scan positioning system described herein is that the amount of data generated is minimal compared to that of a camera-based system. For example, no redundant data is generated, and no compression is required. The samples (transition times and/or transition time signals) can be sequential, and can be transmitted for immediate remote processing with very little additional latency. By using a broadcasted common trajectory mapping function, all position sensing devices can calculate their positions at the same time and can provide their position to a remote device for addition processing. So, the described system can be scalable for multiple position sensing devices, multiple projection systems, and multiple reference surfaces, but with little to no computing bottlenecks.

In some scenarios, one or more position sensing devices can be employed in an immersive augmented reality application. An example may be similar to the one illustrated in FIG. 11. A traditional Virtual Reality system such as deployed by CRVM in Marseille is know by its recursive acronym CAVE (cave automatic virtual environment) It is typically a cubic enclosure where five or all six wall surfaces have stereoscopic images projected on them. Once inside, a person's entire view (in all directions) is "synthetically" generated in the form of stereoscopic #3D by racks of GPUs. Typically the viewer wears filter glasses (e.g. Infitec Narrow band filters) allowing for separate images to be seen by right and left eye (a six-sided cube requires 12 separate images to projected simultaneously). These immersive systems can be made interactive by actively tracking the viewer's view point and view direction and by generating stereoscopic images, in real time, with a perspective that is adjusted along six degrees of freedom ("6 DoF") for each eye.

Current systems typically use separate tracking systems consisting of optical sensors mounted at the edge of the display and pointing back at the viewer. To achieve tracking accuracy these systems use fiducials (such as retro-reflective optical targets) to be attached to 3D glasses and other devices, such as 3D pointers and tracking gloves. These optical motion capture systems typically require complex installation and careful calibration, making them costly and unsuitable for mobile applications. A significant limitation of such systems can be the unacceptably slow motion response caused by frame delays and large data loads in high resolution camera-based systems. Even in a high end system, a latency of 100-150 milliseconds, five or six camera frames is typical.

The Position Sensing Device system described herein can be utilized as the basis for a simple and inexpensive alternative motion capture system, which can eliminate the use of cameras entirely. A major advantage is that no additional equipment is required at the screen, that the trackers are tiny and inexpensive, and that there is virtually no limit to the number of positions that can be tracked independently by using a common scanned timed trajectory reference embedded in the projected images. An optical PSD tracking system can be implemented both for rear or back projection systems in large fixed installation such as a CAVE, and as a mobile or head mounted tracking system, e.g. in a near-the-eye system such PhotonJet's UltraLight™ mobile vision system. In the latter case, the location of the screen within the projector's scan path may be determined in real time by means of a fast feedback loop built into the projection system. The PSDs observe the same surface (which may be in motion itself) and the instantaneous location of the spot formed by the scanning beam on the surface as a function of time is known and made available to the PSDs as described above. PSDs can be attached to head mounted gear, and multiple viewpoints as well as the positions of hands and objects can be tracked simultaneously, enabling high-speed, real-time 3D immersive motion-image interactions.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for determining a position of a sensing device, comprising:
    employing at least one sensor of the sensing device that is arranged with at least one aperture to detect at least one spot illuminated by a beam that is scanned across a surface over time, and wherein the at least one spot is defined by its location on the surface over time;
    employing the at least one sensor to observe at least three spots on the surface over time through at least three lines of sight between each of the at least three spots and the at least one sensor, wherein each line of sight is based on the arrangement of the at least one sensor and the at least one aperture;
    determining an observation angle between each of the at least three lines of sight;
    determining each location of each of the at least three spots based on a time that each of the at least three spots are observed by the at least one sensor; and
    determining a position of the sensing device relative to the surface based on each location of the at least three spots and each determined observation angle.

2. The method of claim 1, wherein determining each location further comprises employing a pixel trajectory time map of the beam to determine each location at a particular time that corresponds to each spot.

3. The method of claim 1, wherein the at least three lines of sight are determined by a plurality of apertures in the sensing device that are arranged with the at least one sensor.

4. The method of claim 1, wherein the at least three lines of sight are determined by the at least one aperture in the sensing device and a plurality of sensors.

5. The method of claim 1, further comprising:
    determining a series of times for each of the at least three spots over multiple scans of the beam across the surface; and
    compensating for motion of the sensing device during the scanning of the beam based on at least estimating a trajectory of each of the at least three spots for the series of times.

6. The method of claim 1, wherein determining the position of the sensing device further comprises solving a three point perspective pose arrangement based on at least each location of the at least three spots and the observation angles.

7. The method of claim 1, further comprising:
    employing the position of the sensing device to modify a virtual environment.

8. A sensing hardware device, comprising:
    at least one sensor that is arranged with at least one aperture to detect at least one spot illuminated by a beam that is scanned across a surface over time, and wherein the at least one spot is defined by its location on the surface over time; and
    a processor that is operative to perform actions, including:
        employing the at least one sensor to observe at least three spots on a surface over time through at least three lines of sight between each of the at least three spots and the at least one sensor, wherein each line of sight is based on the arrangement of the at least one sensor and the at least one aperture and has an observation angle between each other line of sight;
        determining each location of each of the at least three spots based on a time that each of the at least three spots are observed by the at least one sensor; and
        determining a position of the sensing device relative to the surface based on each location of the at least three spots and each determined observation angle.

9. The sensing hardware device of claim 8, wherein determining each location further comprises employing a pixel trajectory time map of the beam to determine each location at a particular time that corresponds to each spot.

10. The sensing hardware device of claim 8, wherein the at least three lines of sight are determined by a plurality of apertures in the sensing device that are arranged with the at least one sensor.

11. The sensing hardware device of claim 8, wherein the at least three lines of sight are determined by the at least one aperture in the sensing device and a plurality of sensors.

12. The sensing hardware device of claim 8, wherein the processor is operative to perform further actions, comprising:
    determining a series of times for each of the at least three spots over multiple scans of the beam across the surface; and
    compensating for motion of the sensing device during the scanning of the beam based on at least estimating a trajectory of each of the at least three spots for the series of times.

13. The sensing hardware device of claim 8, wherein determining the position of the sensing device further comprises solving a three point perspective pose arrangement based on at least each location of the at least three spots and the observation angles.

14. A system for determining a position of a sensing device, comprising:
    a projection device that is operative to scan a beam across a surface to illuminate at least one spot across the surface over time, wherein the at least one spot is defined by its location on the surface over time;
    at least one sensor within the sensing device that is arranged with at least one aperture to detect the at least one spot; and
    a position detection device, including:
        a memory for storing instructions; and
        a processor that executes the instructions to enable actions, comprising:
            employing the at least one sensor to observe at least three spots on the surface over time through at least three lines of sight between each of the at least three spots and the at least one sensor, wherein each line of sight is based on the arrangement of the at least one sensor and the at least one aperture;
            determining an observation angle between each of the at least three lines of sight;
            determining each location of each of the at least three spots based on a time that each of the at least three spots are observed by the at least one sensor; and
            determining a position of the sensing device relative to the surface based on each location of the at least three spots and each determined observation angle.

15. The system of claim 14, wherein determining each location further comprises employing a pixel trajectory time map of the beam to determine each location at a particular time that corresponds to each spot.

16. The system of claim 14, wherein the at least three lines of sight are determined by a plurality of apertures in the sensing device that are arranged with the at least one sensor.

17. The system of claim 14, wherein the at least three lines of sight are determined by the at least one aperture in the sensing device and a plurality of sensors.

18. The system of claim 14, wherein the processor of the position detection device enables further actions, comprising:
   determining a series of times for each of the at least three spots over multiple scans of the beam across the surface; and
   compensating for motion of the sensing device during the scanning of the beam based on at least estimating a trajectory of each of the at least three spots for the series of times.

19. The system of claim 14, wherein determining the position of the sensing device further comprises solving a three point perspective pose arrangement based on at least each location of the at least three spots and the observation angles.

20. The system of claim 14, wherein the processor of the position detection device enables further actions, comprising:
   employing the position of the sensing device to modify a virtual environment.

* * * * *